United States Patent Office 3,102,121
Patented Aug. 27, 1963

3,102,121
NOVEL CUMARANSULFONYLUREAS AND 2,3-DIHYDROTHIONAPHTHENESULFONYLUREAS
Hermann Breuer and Hans Höhn, Regensburg, Germany, assignors to Olin Mathieson Chemical Corporation, New York, N.Y., a corporation of Virginia
No Drawing. Filed Nov. 19, 1962, Ser. No. 238,767
Claims priority, application Germany June 29, 1961
11 Claims. (Cl. 260—330.5)

This application is a continuation-in-part of application Serial No. 198,422, and of application Serial No. 198,462, both filed May 29, 1962, both now abandoned.

This invention relates to cumaransulfonylureas and to 2,3-dihydrothionaphthenesulfonylureas.

The compounds of this invention may be represented by the following structural formula (I)
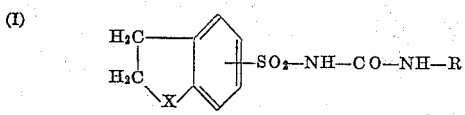

wherein X represents oxygen or sulfur and R represents alkyl, alkenyl, aryl, aralkyl, cycloalkyl, cycloalkyl-alkyl, alkoxyalkyl or alkylthioalkyl.

Metal salts such as alkali metal and alkaline earth metal salts of such compounds are also within the scope of this invention.

Illustrative of the substituents represented by the symbol R are straight and branched chain lower alkyl groups such as methyl, ethyl, propyl, isopropyl, butyl, tertiary butyl and the like; aryl groups e.g. naphthyl, phenyl and monosubstituted phenyl groups e.g. $R^1$-phenyl wherein $R^1$ is hydrogen, halo, lower alkyl or lower alkoxy, such as halophenyl, for example p-chlorophenyl, m-chlorophenyl, p-bromophenyl, lower alkoxyphenyl, for example p-methoxyphenyl, lower alkylphenyl, for example o-, m- or p-tolyl and the like; aralkyl groups especially $R^1$-phenyl-lower alkyl groups such as benzyl and substituted phenyl-lower alkyl wherein the aryl portion is the same as those enumerated above; lower alkenyl groups such as allyl, butenyl and the like; cycloalkyl groups, e.g. cyclo-lower alkyl groups, especially those having 4 to 6 carbon atoms such as cyclobutyl, cyclopentyl and cyclohexyl; cycloalkyl groups of the character mentioned attached to lower alkyl groups of the type already described, for example cyclopentylmethyl, cyclohexylethyl and the like; alkoxyalkyl, especially lower alkoxy-lower alkyl substituents containing lower alkoxy groups of the type described, for example methoxymethyl, methoxyethyl, ethoxymethyl and the like; and similar lower alkylthio-lower alkyl groups, for example methylmercaptomethyl, ethylmercaptomethyl and the like. Representative salts include alkali metal and alkaline earth metal salts such as sodium, potassium, calcium and barium salts.

The compounds of this invention are hypoglycemic agents with long duration of action which are effective in lowering blood sugar and are therefore useful as oral anti-diabetic agents. The compounds of Formula I or pharmaceutically acceptable salts thereof may be administered orally in conventional dosage forms such as tablets, capsules and the like.

The cumaransulfonylureas and dihydrothionapthenesulfonylureas of this invention may be produced by converting a sulfonamide of the formula (II)
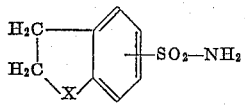

wherein X represents oxygen or sulfur, into a salt, e.g., a sodium salt, and reacting the salt with a derivative of isocyanic acid, e.g., an isocyanic acid of the formula (III)    O—C=N—R wherein R has the meaning defined above.

Correspondingly substituted carbonic acid derivatives such as urethanes or carbamic acid halides may be used instead of the isocyanates, or the sulfonamide of Formula II may be reacted with a urea bearing the substituent R, as previously defined, on one nitrogen and an acyl substituent on the other nitrogen.

Another alternative route is a multi-step reaction in which the sulfonamide (II) is converted to an intermediate which will react with an amine of the formula (IV)    R—NH$_2$ R having the same meaning as above. Such derivatives include, for example, cumaransulfonylisocyanates, cumaransulfonylurethanes, cumaransulfonylcarbamic acid halides and cumaransulfonylureas of Formula I wherein the R-substituent is hydrogen or acyl, as well as dihydrothionaphtheneisocyanates, dihydrothionaphthenesulfonylurethanes, dihydrothionaphthenesulfonyl carbamic acid halides, and dihydrothionaphthenesulfonylureas of Formula I wherein the R-substituent is hydrogen or acyl.

The products of this invention may also be produced by first forming a corresponding cumaransulfonylthiourea, cumaransulfonylguanidine or dihydrothionaphthenesulfonylguanidine and converting this by conventional procedures to the desired product of Formula I. Also, a cumaransulfonyl halide or dihydrothionaphthenesulfonyl halide may be reacted with an isourea alkyl ether, preferably in the form of its salt, and the product of this reaction hydrolized to obtain the compound of Formula I.

The following examples are illustrative of the invention. All temperatures are expressed in degrees centigrade.

Example 1

8 gm. of n-butylisocyanate are added dropwise with stirring over a period of 50 minutes at a temperature of 10° to 13.5 gm. of 2,3-dihydrothionaphthene-6-sulfonamide (M.P. 178°) dissolved in 31.3 ml. of 2 N sodium hydroxide and 35 ml. of acetone. The reaction mixture is permitted to stand for 2 hours and then the acetone is distilled off in vacuo. The residue is diluted with about 300 ml. of water and filtered off from the insoluble portion. 1-butyl-3-(2,3-dihydrothionaphthene-6-sulfonyl)-urea is precipitated with dilute hydrochloride acid. The product is reprecipitated and then recrystallized from ethanol, M.P. 149–150°.

Example 2

By substituting cyclohexylisocyanate for the n-butylisocyanate in Example 1, 1-cyclohexyl-3-(2,3-dihydrothionaphthene-6-sulfonyl)urea is obtained.

Example 3

By the procedure of Example 1, the following additional compounds are obtained:

1-allyl-3-(2,3-dihydrothionaphthene-6-sulfonyl)urea
1-phenyl-3-(2,3-dihydrothionaphthene-6-sulfonyl)urea
1-benzyl-3-(2,3-dihydrothionaphthene-5-sulfonyl)urea
1-cyclopentylmethyl - 3 - (2,3-dihydrothionaphthene-6-sulfonyl)urea
1-methoxymethyl - 3 - (2,3 - dihydrothionaphthene-6-sulfonyl)urea
1-ethylmercaptomethyl - 3 - (2,3-dihydrothionaphthene-6-sulfonyl)urea
1-tolyl-3-(2,3-dihydrothionaphthene-6-sulfonyl)urea
1-p-chlorophenyl - 3 - (2,3 - dihydrothionaphthene-5-sulfonyl)urea

Example 4

11.7 gm. of cyclohexylisocyanate are added dropwise to 14 gm. of cumaran-6-sulfonamide (M.P. 186–187°) dissolved in 34.5 ml. of 2 N sodium hydroxide and 40 ml. of acetone at a temperature of 10° over a period of 50 minutes. The reaction mixture is permitted to stand for 2 hours and the acetone is then distilled off in vacuo. The residue is diluted with about 400 ml. of water and then filtered off from the insoluble portion. The crude 1-cyclohexyl-3-(6-cumaransulfonyl)urea is precipitated with dilute hydrochloric acid. The product is reprecipitated and then recrystallized from methanol, M.P. 191–191.5°.

Example 5

By substituting n-butylisocyanate for the cyclohexylisocyanate in the procedure of Example 4, 1-n-butyl-3-(6-cumaransulfonyl)urea, M.P. 151–151.5°, is obtained.

Example 6

By the procedure of Example 4, the following additional compounds are obtained:

1-allyl-3-(6-cumaransulfonyl)urea
1-phenyl-3-(6-cumaransulfonyl)urea
1-benzyl-3-(5-cumaransulfonyl)urea
1-cyclopentylmethyl-3-(6-cumaransulfonyl)urea
1-methoxymethyl-3-(6-cumaransulfonyl)urea
1-ethylmercaptomethyl-3-(6-cumaransulfonyl)urea
1-tolyl-3-(6-cumaransulfonyl)urea
1-p-chlorophenyl-3-(5-cumaransulfonyl)urea

What is claimed is:

1. A compound selected from the group consisting of sulfonylureas having the formula

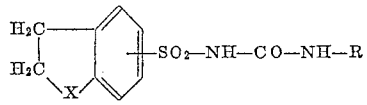

wherein X is a member of the group consisting of oxygen and sulfur and R is a member of the group consisting of lower alkyl, lower alkenyl, cycloalkyl of 4 to 6 carbon atoms, cycloalkyl-lower alkyl, said cycloalkyl having 4 to 6 carbon atoms, lower alkoxy-lower alkyl, lower alkylthio-lower alkyl, $R^1$-phenyl, $R^1$-phenyl-lower alkyl, wherein $R^1$ is a member of the group consisting of hydrogen, halo, lower alkyl and lower alkoxy, and alkali metal and alkaline earth metal salts thereof.

2. A compound of the formula

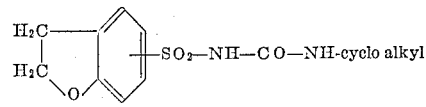

the cycloalkyl having 4 to 6 carbon atoms.

3. A compound of the formula

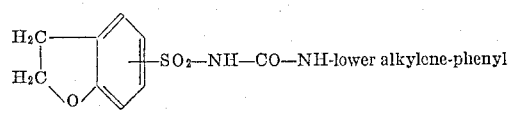

4. A compound of the formula

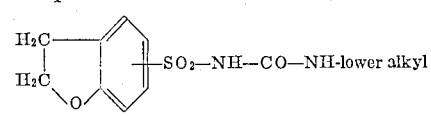

5. 1-butyl-3-(6-cumaransulfonyl)urea.
6. 1-cyclohexyl-3-(6-cumaransulfonyl)urea.
7. A compound of the formula

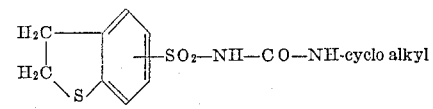

the cycloalkyl having 4 to 6 carbon atoms.

8. A compound of the formula

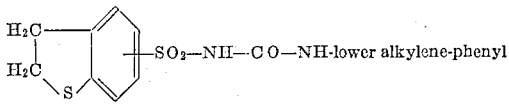

9. A compound of the formula

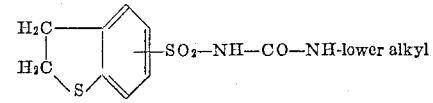

10. 1-butyl-3-(2,3-dihydrothionaphthene-6-sulfonyl)-urea.

11. 1-cyclohexyl-3-(2,3-dihydrothionaphthene-6-sulfonyl)urea

No references cited.